UNITED STATES PATENT OFFICE.

NATHAN SULZBERGER, OF NEW YORK, N. Y.

PROCESS FOR UTILIZING SPENT FULLERS' EARTH.

968,092.     Specification of Letters Patent.     Patented Aug. 23, 1910.

No Drawing.     Application filed February 17, 1910. Serial No. 544,502.

*To all whom it may concern:*

Be it known that I, NATHAN SULZBERGER, a citizen of the United States, residing at the Gotham Hotel, Fifty-fifth street and Fifth avenue, New York city, in the county of New York and State of New York, have invented a new and useful Improvement in a Process for Utilizing Spent Fullers' Earth, of which the following is a specification.

Fullers' earth, which is today used extensively in deodorizing and decolorizing fats and oils, retains after having been used for such purposes larger or smaller amounts (often around ten per cent.) of the treated material. Such material is today practically lost and wasted since the processes for recovering these absorbed and retained amounts (or at least a percentage of the same) are not sufficiently economical. Therefore, today little endeavor is made to free such spent fullers' earth from these quantities of retained substances or of utilizing spent fullers' earth and its fatty contents in some other way and the fact of their going to waste or of their not being used up to their full value is all the more deplorable, since the fatty and oily material which such spent fullers' earth retains is almost always of a very high grade and quality, since a very large portion of the fatty material, which is today subjected to the treatment of fullers' earth, is used for edible purposes.

I have experimentally found that such spent fullers' earth and the fatty contents of the same can be rendered again commercially available and utilized by saponifying the fatty contents of the same with a caustic alkali or otherwise. By this process a soapy compound is obtained possessing abrasive and detergent qualities due to the fullers' earth, which the same contains.

As an example of my process I cite the following: Twenty pounds of fullers' earth, which had been used in de-odorizing and decoloring lard, were treated with an aqueous solution of a slight excess of caustic potash; after saponification the mass was dried down to a semi-solid consistency; this material may be bleached or perfumed if desired.

My process can be employed in all cases where a finely divided matter, in particular of mineral origin, is used in the treatment of oily and fatty material. The process may also be modified as to suit the particular appliance of the same in various ways, for instance—if caustic soda has been used in saponifying the fatty material retained in the fullers' earth, the water may be evaporated more or less completely and the product obtained in the form of a dry mass, which may be powdered and which powdered product possesses all the abrasive and detergent qualities of the fullers' earth, advantageously increased by the addition of soap, this soap being the saponified fatty matter, which the spent fullers' earth originally contained.

In regaining the fatty material retained in the spent fullers' earth, by saponifying the same with an alkali, allowance must be made in adding the amount of alkali for the fact that fullers' earth itself will connect up with a certain amount of alkali, depending on the specific sample of fullers' earth which has been used in the treatment of the fatty material.

I claim:

1. Process for rendering commercially available fullers' earth, which has been used in deodorizing and decoloring substances of a fatty nature, consisting in saponifying the oleaginous contents, which said fullers' earth has artificially absorbed and retained by virtue of its having been used for deodorizing and decoloring substances of a fatty and oily nature.

2. Process for rendering commercially available substances of a mineral nature, which have been used in deodorizing and decoloring substances of a fatty nature, consisting in saponifying the oleaginous matter, which the said mineral matters have artificially absorbed and retained by virtue of their having been used for deodorizing and decoloring substances of a fatty and oily nature.

3. The method of transforming oleaginous contents of spent fullers' earth, with which said spent fullers' earth has become impregnated by it having been used in deodorizing and decoloring fatty and oily substances, into a soapy compound, consisting in subjecting such spent fullers' earth to a process of saponifying the artificially absorbed fatty matter, in order to convert the fatty constituents into a soap.

NATHAN SULZBERGER.

Witnesses:
R. CHRISTIANSEN,
GEORGE H. OCEAR.